United States Patent [19]
Rozycki

[11] Patent Number: 4,630,247
[45] Date of Patent: Dec. 16, 1986

[54] VIBRATOR THERMAL-STRESS DIFFERENTIAL COMPENSATOR

[75] Inventor: Marek L. Rozycki, Panorama City, Calif.

[73] Assignee: Litton Resources Systems, Inc., Alvin, Tex.

[21] Appl. No.: 660,527

[22] Filed: Oct. 12, 1984

[51] Int. Cl.⁴ .................. G01V 1/04; H04R 11/00
[52] U.S. Cl. .................. 367/189; 181/114; 181/119
[58] Field of Search .......... 181/114, 119, 121, 113, 181/116, 120; 367/189, 190, 143

[56] References Cited

U.S. PATENT DOCUMENTS

| | | | |
|---|---|---|---|
| 4,056,164 | 11/1977 | Johnston | 181/119 |
| 4,114,722 | 9/1978 | Weber et al. | 181/119 X |
| 4,147,228 | 4/1979 | Bouyoucoj | 181/119 |
| 4,388,981 | 6/1983 | Fair | 367/189 X |
| 4,406,345 | 9/1983 | Fair | 181/119 |
| 4,410,062 | 10/1983 | Mifsud | 181/121 |
| 4,506,758 | 3/1985 | Fair | 181/121 |
| 4,519,053 | 5/1985 | Bedenbender et al. | 367/190 |

Primary Examiner—Charles T. Jordan
Assistant Examiner—Brian S. Steinberger
Attorney, Agent, or Firm—William A. Knox; Barry C. Kane

[57] ABSTRACT

An apparatus for preventing thermally-induced stress fatigue in a vibrator support housing consists of a stress compensator that absorbs thermal dimensional changes between major structural components made of dissimilar materials. The stress compensator consists of a hydraulic clamp wedged between the free end of a vibrator actuator piston shaft and the supporting housing. Actuated by the substantially-constant system hydraulic pressure, the hydraulic clamp maintains a substantially constant clamping force between the actuator piston shaft and the supporting housing. Thermally-induced stresses are absorbed by the hydraulic system.

6 Claims, 4 Drawing Figures

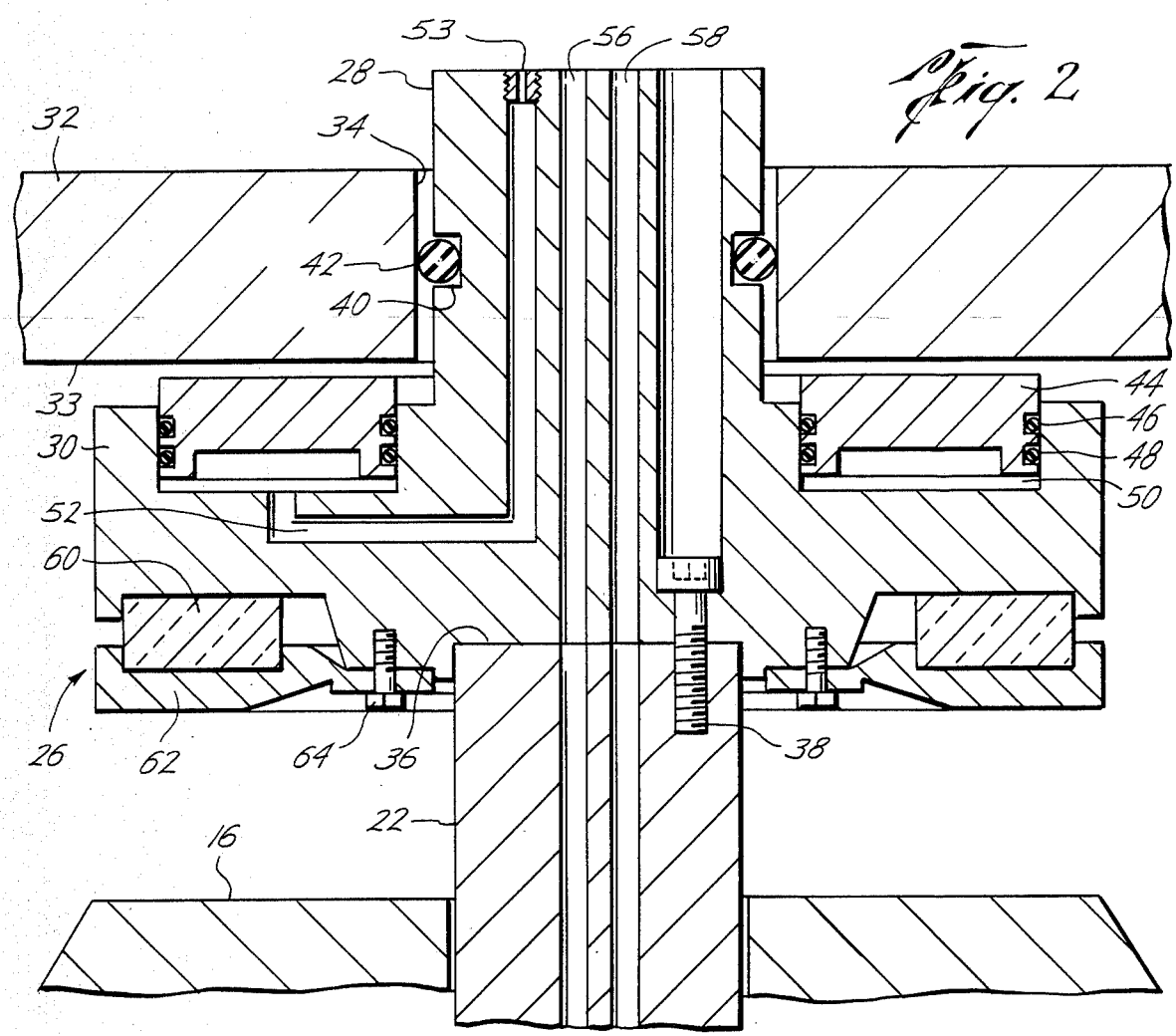
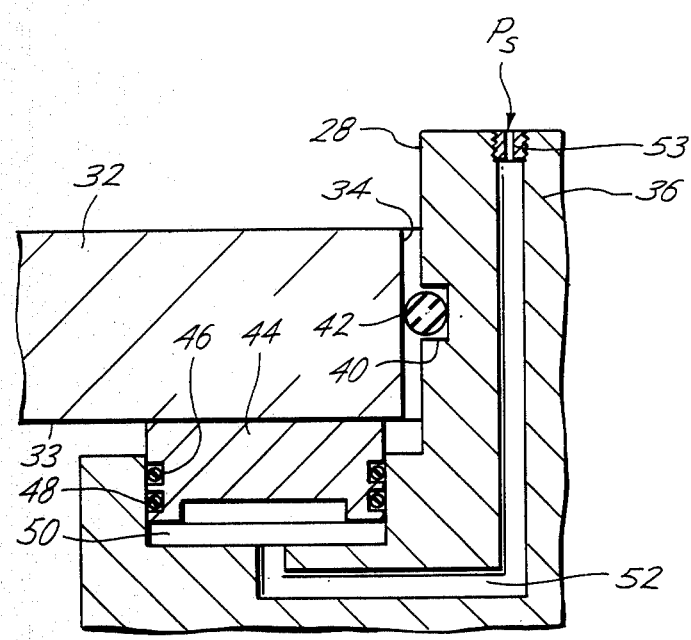

VIBRATOR THERMAL-STRESS DIFFERENTIAL COMPENSATOR

BACKGROUND OF THE INVENTION

1. Field of the Invention

This invention relates to vibrators for injecting seismic signals into the earth and particularly to an apparatus for preventing stress fatigue in vibrator stilt structures.

2. Description of the Prior Art

Conventional seismic vibrators consist of a well-known ground-contacting baseplate, a dual-ended actuator assembly with one end connected to the baseplate, and a support frame connected to the baseplate and to the other end of the actuator assembly. The baseplate is attached by well known hydraulic columns to a support vehicle such as a truck.

The support frame, also known as a stilt structure, is usually constructed of I-beam or channel steel in the form of a rectangular arch. The frame provides upright support for the actuator and also reinforces the coupling of the actuator to the baseplate.

Conventional vibrators usually operate within the range of 5–80 Hz. The large mass of the baseplate/stilt structure system does not limit and distort the amplitude of relatively low frequency signals. However, when operated at frequencies in the range of 80–150 Hz and above, conventional vibrators tend to inject attenuated and distorted signals. Distortion of the vibrator output signal at the higher frequencies results from mechanical resonances that develop in the baseplate and stilt structure. The baseplate may resonate in such a manner that the displacement at the center of the plate may be substantially out of phase with respect to the displacement of the edges thereof.

In order for high-frequency vibrators to operate efficiently, it is necessary to reduce the weight of the baseplate and stilt structure so as to improve the frequency response of the spring-mass system (baseplate and stilt structure). It is also essential to provide structural stiffness in the baseplate and stilt structure to minimize mechanical resonance development.

U.S. Pat. No. 4,406,345 issued to Fair teaches a construction design for high-frequency vibrators. The design is intended to provide structural stiffness while also reducing the weight of the baseplate assembly.

Fair replaces the conventional I-beam-type stilt structure with a frusto-conical vibrator housing that completely encloses the actuator assembly. The shape of the steel housing provides maximum support with less weight. The bottom flange of the housing is firmly bolted to the baseplate adding structural stiffness to the plate and housing. FIG. 1 of Fair's patent illustrates a typical construction of a high-frequency vibrator.

To further increase the efficiency of high-frequency vibrators, the baseplate and housing may be fabricated of light-weight high-strength materials such as aluminum or titanium alloys or plastic laminates. However when using dissimilar materials in major structural elements of vibrator construction, in contrast to Fair's all-steel construction, a high rate of structural failures occur.

A majority of structural failures occur as a result of variable initial prestress within the structure. This is particularly true when the dissimilar materials are characterized by different coefficients of thermal expansion. For example, aluminum has an expansion coefficient that is 2 times that of steel. When aluminum and steel structures are rigidly bolted together, as they are in a high-frequency vibrator, a moderate temperature change creates a large stress due to differential expansion or contraction of the two metals which results in a strain or deformation of the respective structures. Eventually, structural failure occurs as a result of fatigue.

It is an object of this invention to prevent vibrator structural failures associated with thermally-induced strains.

SUMMARY OF THE INVENTION

In a seismic vibrator assembly having a linear actuator, a ground-contacting baseplate and a supporting housing for enclosing and coupling the linear actuator to the baseplate, I provide a compensator for preventing thermally-induced strains due to differential expansion and contraction between the housing and the linear actuator.

In accordance with an aspect of this invention, the linear actuator includes upper and lower piston shafts, the lower shaft being fastened to the baseplate. Between the free end of the upper piston shaft and the top wall of the housing I mount a hydraulic clamping assembly. Under system hydraulic pressure, the clamp is urged against the top wall of the housing with a substantially-constant clamping force. The hydraulic fluid system is so configured that thermally-induced differential strains, developed between major structural elements of the linear actuator and its supporting housing, are absorbed by the hydraulic system.

In accordance with another aspect of this invention, a fluidic low-pass filter is provided in association with the clamping means to damp short-term hydraulic pressure pulsations, thereby to maintain a substantially-constant clamping force.

BRIEF DESCRIPTION OF THE DRAWING

A better understanding of the benefits and advantages of my invention may be obtained from the appended detailed description and the drawings, wherein:

FIG. 2 is an enlarged elevational cross-section of the top portion of FIG. 1;

FIG. 4 is an enlarged elevational cross-section of FIG. 2 showing the clamp engaging the top of the housing;

DETAILED DESCRIPTION OF THE PREFERRED EMBODIMENT

Figure 1:
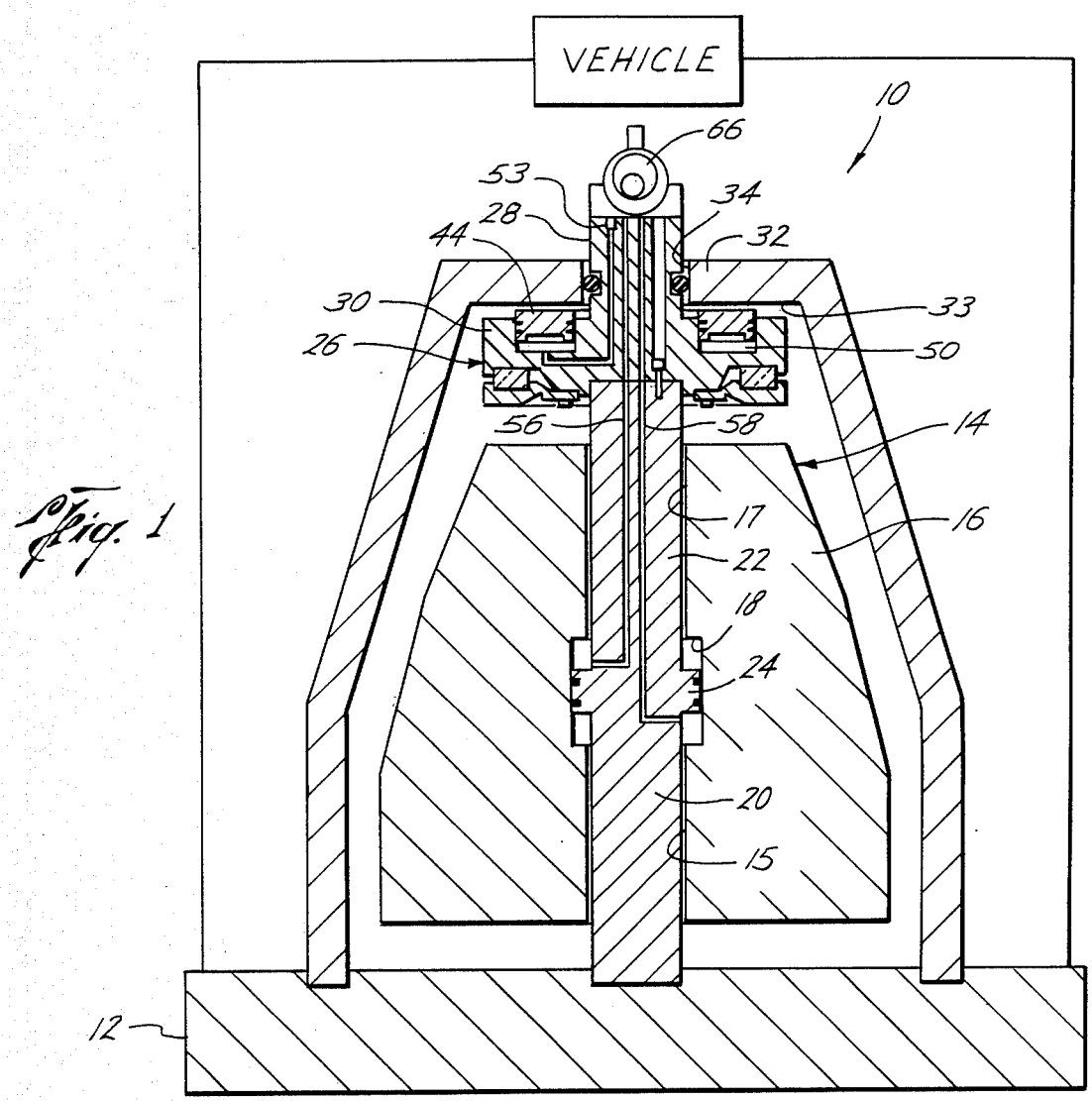
FIG. 1 generally illustrates a vibrator employing the hydraulic clamp of this invention.

Shown in FIG. 1, a high-frequency vibrator 10 includes a baseplate 12 having a linear actuator assembly 14 mounted thereon. Actuator assembly 14 consists of a well-known reaction mass 16 having cylindrical bores 15, 17 for retaining lower and upper piston shafts 20, 22 and a centrally disposed piston 24 slidably mounted in cylinder 18. The free end of lower piston shaft 20 is rigidly fastened to baseplate 12. The free end of upper piston shaft 22 is connected to a thermal stress compensator 26. Compensator 26 includes an upper cylindrical manifold 28 in combination with a hydraulic clamp assembly 30 which is connected to the free end of upper piston shaft 22 mentioned above. A frusto-conical housing 32 completely encloses actuator assembly 14 and compensator 26 with the exception of cylindrical manifold 28 which extends through an aperture 34 through the top or upper wall 33 of housing 32. The bottom periphery of housing 32 is rigidly bolted to baseplate 12. Actuator assembly 14 and compensator 26 are usually fabricated from material such as high tensile-strength steel. Housing 32 and baseplate 12 may be manufactured from a light-weight metal such as aluminum alloy or other material having a high strength-to-weight ratio.

An enlarged elevational cross-section of upper piston shaft 22, compensator 26, and housing 32 is shown in FIG. 2. The free end of upper piston shaft 22 is coupled to the bottom of compensator 26 in recess 36 by bolts such as 38. Cylindrical manifold 28 is retained in aperture 34 in the top wall 33 of housing 32. A suitable amount of lateral clearance such as 0.003 inch may be provided between manifold 28 and housing 32 to allow a sliding relationship. Annular groove 40 and seal 42 in manifold 28 prevent debris from passing through aperture 34.

A ring piston 44 and seals such as 46 and 48 are slidingly mounted in annular cylinder 50 in the upper face of clamp assembly 30. Annular cylinder 50 is in fluid communication through conduit 52 with a high-pressure fluid source 70 shown in FIG. 3. Extending through manifold 28 and clamp assembly 30 are conduits 56 and 58 for supplying pressurized fluid alternately to opposite sides of piston 24 in cylinder 18. Fixed to the lower periphery of clamp assembly 30 is a suitable cushion 60 to soften impact of compensator 26 with reaction mass 16 during large-amplitude strokes of the actuator assembly 14. Cushion 60 may be any suitable shock-absorbing material such as high-density rubber or the like. Cushion 60 is held by a retaining ring 62 which is secured to clamp assembly 30 by bolts 64.

Figure 3:
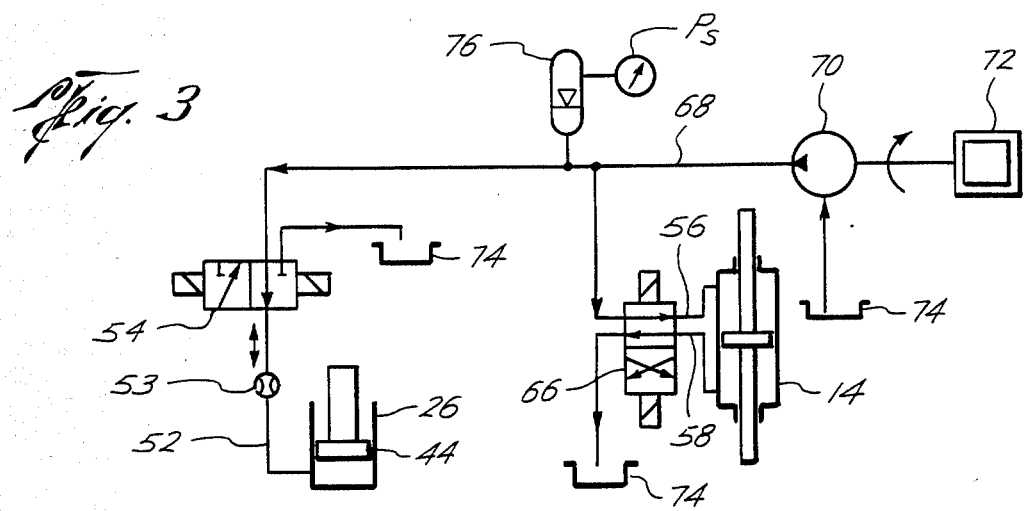
FIG. 3 is a simplified schematic of the hydraulic system of the instant invention.

FIG. 3 is a simplified schematic diagram showing the hydraulic system of the high-frequency vibrator 10 embodying the instant invention.

Linear actuator assembly 14 is operated by high-pressure fluid supplied through conduits 56 and 58 controlled by a pilot-operated servo-valve 66. Servo-valve 66 receives fluid from a supply line 68 that is connected to pump 70 driven by motor 72. Pump 70 draws fluid from a reservoir as indicated by 74. Fluid returns from actuator assembly 14 to reservoir 74.

Hydraulic compensator 26 receives fluid at system pressure $P_s$ through conduit 52 mentioned above. System pressure is the average pressure maintained by the accumulator 76 during operation of the vibrator. Conduit 52 includes a restriction 53 for damping short term pressure pulsations within the fluid system from being transmitted to annular cylinder 50. Short-term pulsations may be due to pressure spikes created when servo valve 66 switches fluid-flow from one side of piston 24 to the other side during operation of the vibrator. Restriction 53 acts as a fluidic low pass mechanical filter for maintaining a substantially constant static pressure $P_s$ in compensator 26 to provide a substantially constant clamping force. Although fluid friction impedes fluid flow through restriction 53 for short-term pressure pulsations, long-term back-pressure changes caused by such phenomena as diurnal temperature variations are readily absorbed by the system. Compensator 26 is actuated by a two-position valve 54 coupling conduit 52 with a supply line 68 described above. Compensator 26 may be deactivated by closing two-position valve 54 to vent fluid in annular cylinder 50 to drain.

As before stated, for a vibrator assembly having major structural elements composed of different materials such as steel and aluminum, substantial diurnal temperature changes will create differential dimensional changes in the structures. The differential dimensional changes, feeding back through the clamping assembly 30, necessarily create corresponding long-term volume changes in the hydraulic system. Those long-term volume changes are absorbed by accumulator 76 to relieve potential stresses and consequent damage. That is, because accumulator 76 controls the average system pressure $P_s$, the force exerted by clamp assembly 30 can never exceed that corresponding to the average system pressure which is usually about 3000 psi. Accumulator 76 in cooperation with restriction 53 therefore causes clamp assembly 30 to maintain a substantially constant clamping force against the top wall 33 of housing 32. For the proper operation of the damping assembly piston 44 area is selected to be 2.5 to 4 times the main actuator piston area.

Just before operation of vibrator 10, valve 54 is opened to apply high pressure fluid to conduit 52 in manifold 28 under system pressure $P_s$. Necessarily, the fluid forces ring piston 44 upwards to wedge rigidly against the top wall 33 of housing 32, securely clamping upper piston shaft 22 to housing 32 as shown in FIG. 4. Clamp assembly 30 and ring-piston 44 clamp piston shaft 22 in fixed relation to housing 32.

For illustrative purposes, my invention has been described with a certain degree of specificity. Variations will occur to those skilled in the art but which may be included within the scope and spirit of this invention which is limited only by the appended claims. For example, the clamping assembly 30 could be mounted beneath the lower end of the piston shaft, between the piston shaft and the baseplate. In the case of a horizontal shear-wave vibrator, the clamping assembly could be disposed horizontally between the lateral walls of the housing. The expansible clamping assembly may be pneumatically operated instead of being hydraulically operated as was shown by way of example but not by way of limitation.

I claim as my invention:

1. An apparatus for preventing thermally-induced stresses in a seismic vibrator actuator assembly including a ground-contacting baseplate, a linear actuator having first and second piston shafts, each having a free end; the free end of said first piston shaft being secured to said baseplate, and a housing having walls, fastened to said baseplate for supporting and enclosing the linear actuator, the first and second piston shafts being formed from a metal that is dissimilar to that from which said housing is formed, and means for supporting said baseplate from a transport unit, comprising:

an expandable clamping means coupled to the free end of said second piston shaft; and means for expanding said clamping means to wedge said clamping means rigidly between the free end of said second piston shaft and a wall of said housing under a substantially-constant clamping force.

2. The apparatus according to claim 1, comprising:

means, incorporated with said means for expanding, for absorbing long term thermally-induced differential strains between said linear actuator-assembly housing and said first and second piston shafts.

3. The apparatus according to claim 2, wherein said clamping means comprises:

an annular cylinder secured to the free end of said second piston shaft;

a ring piston slidingly mounted in said annular cylinder;

a conduit for supplying pressurized fluid at a preselected substantially constant pressure to said annular cylinder to urge said ring piston against the wall of said actuator-assembly housing.

4. The apparatus according to claim 3, wherein said means for absorbing further comprises:

a fluidic low-pass filter in said conduit for damping short-term pressure pulsations from being transmitted to said annular cylinder.

5. In a seismic vibrator, a thermal-stress compensator for use with a housing having an upper wall that is perforated by a central aperature, the housing being secured to a ground-contacting baseplate, a linear actuator assembly mounted within said housing, the linear actuator including a reaction mass that has an external cylinder wherein is slidingly mounted a piston from which extend upper and lower piston shafts, each having a free end, the free end of the lower piston shaft being rigidly secured to said baseplate, the improvement comprising:

a hydraulic clamp secured to the free end of the upper piston shaft, positioned between the piston shaft end and the upper wall of said housing, the clamp including an annular cylinder and a ring-piston slidingly mounted therein, the clamp further including a cylindrical manifold projecting through said central aperture in the upper wall of said housing, the manifold having a plurality of hydraulic-fluid conduits, at least one of said conduits being in communication with said annular cylinder;

means for introducing hydraulic fluid under system pressure into said annular cylinder through said at least one conduit, for pressing said ring-piston against the upper wall of said housing with a substantially constant clamping force; and means for absorbing long-term system volume changes due to thermally-induced differential strains between said linear actuator assembly and said housing.

6. The apparatus according to claim 5 further including a fluidic low-pass filter mounted in said at least one conduit for damping short-term pressure pulsations from being introduced to said annular cylinder.

* * * * *